Patented Jan. 16, 1923.

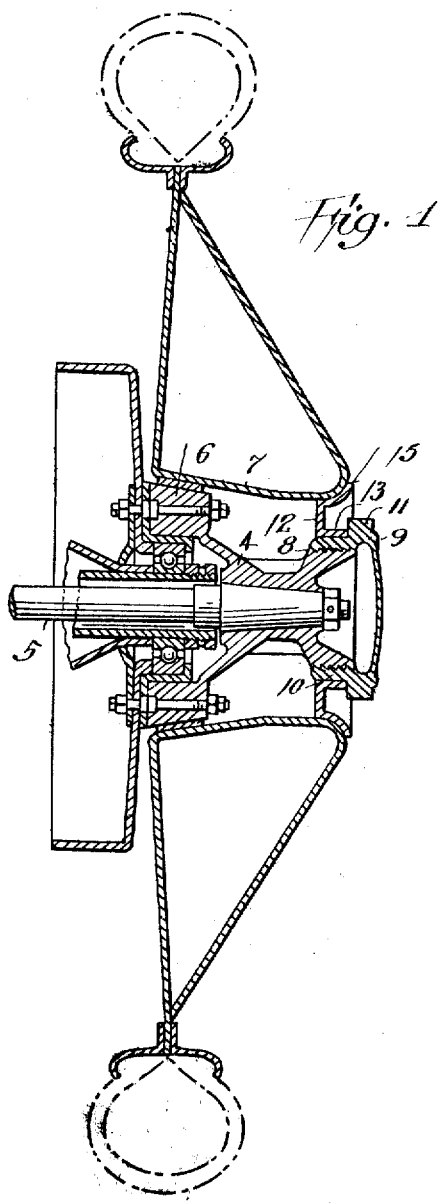
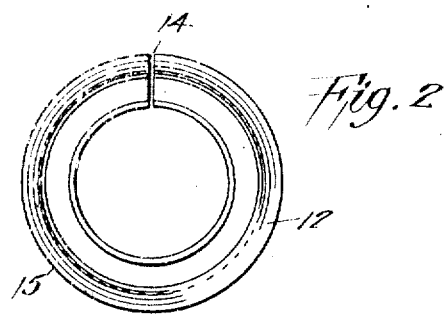
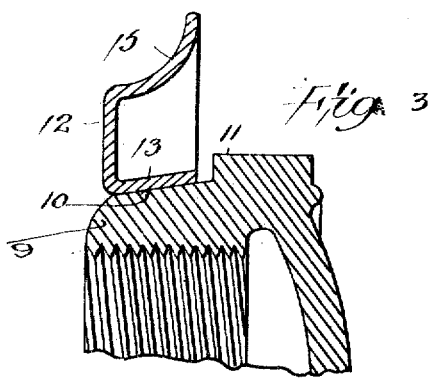

1,442,621

UNITED STATES PATENT OFFICE.

JOSEPH LEDWINKA, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

RETAINING DEVICE FOR REMOVABLE WHEELS.

Original application filed February 21, 1917, Serial No. 150,084. Divided and this application filed October 9, 1917. Serial No. 195,514.

*To all whom it may concern:*

Be it known that I, JOSEPH LEDWINKA, a citizen of the United States, residing at Philadelphia, in the county of Philadelphia and State of Pennsylvania, have made a certain new and useful Invention in Retaining Devices for Removable Wheels, of which the following is a specification.

This invention relates to removable wheels for vehicles, and particularly to detachable retaining devices therefor.

The object of the invention is to provide a detachable retaining device for wheels which is efficient in clamping and retaining the wheel in position, but which is readily and easily detachable to permit the wheel to be removed or replaced.

A further object of the invention is to provide a retaining device of the nature and character referred to which is simple in structure, economical of manufacture, and strong and durable in operation.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Referring to the accompanying drawing:—

Fig. 1 is a view in central section of a removable wheel structure showing a detachable retaining device applied thereto and embodying the principles of my invention.

Fig. 2 is a detached detailed view of a form of the split retainer ring employed and constructed in accordance with my invention.

Fig. 3 is a detached detailed view in section showing the detachable retaining ring and hub cap in their relative assembled relation.

In carrying out my invention I employ any desired form of hub structure upon which is detachably mounted any desired form of removable wheel. In the particular form shown as illustrative of a simple hub structure and detachable wheel mounted thereon, a hub member 4 is mounted upon an axle 5. The hub device or sleeve 4 is provided with an inner portion 6 of large diameter and exteriorly shaped to conform to and to receive the bore of the wheel hub sleeve portion 7. In practice I prefer to form the enlarged portion 6 of tapering conformation peripherally, and the wheel sleeve is complementarily tapered in the opposite direction so as to slip over the hub portion 6 and to be held and clamped thereon by pressure exerted against the outer portion of the wheel sleeve. The outer end of the hub 4 is of reduced diameter and is exteriorly screw threaded as indicated at 8 to receive the interiorly threaded clamp nut 9 in the usual manner. This clamp nut 9 is provided with a tapering or cone shaped exterior peripheral surface 10, for a portion of its length, and a raised shoulder portion 11 for the remainder of its length. Upon the exteriorly tapered surface 10 of the clamp nut is mounted a retaining clamp ring member 12. This clamp ring member 12 is stamped or pressed out of sheet metal and is formed with a hub sleeve portion 13 which is interiorly tapered complementary to the exterior taper of the clamp nut 9 and is received upon the tapered surface 10 of the clamp nut. The retaining ring 12 is preferably split as indicated at 14, see Fig. 2 in order to secure circumferential resiliency, and is also provided with an outwardly extending curved rim or engaging portion 15 suitably shaped to bear against and engage the outer end of the wheel sleeve 7 or other convenient portion of the detachable wheel. By this construction when the screw cap 9 is turned up on the threaded portion 8 of the hub 4 the retaining ring 12 is clamped against the outer end of the wheel hub or sleeve and presses the latter into firm and efficient bearing upon the cone shaped portion 6 of the axle hub. By reason of the retaining ring 12 being of resilient sheet metal and being split, as the clamp nut 9 is turned up to cause efficient gripping action of the retaining ring 12, or the engaging portion 15 thereof, with the wheel hub, the retaining ring is forced over the tapering surface 10 of the screw cap 9 and is thereby expanded, and consequently it exerts an increasingly gripping action upon the clamp nut to prevent the latter from becoming accidentally backed off from the threaded arm of the hub portion 4. Thus the retaining ring not only retains the wheel upon the axle hub but also constitutes a clamping lock to prevent the cap nut 9 from being backed off. At the same time the structure permits the ready detachability of the cap nut and retaining ring for the purpose of permitting the wheel to be detached and removed from the axle hub for repair, replacement, or other purpose.

I have shown my invention as applied to a wheel of the pressed steel type, but obviously I am not to be limited or restricted in this respect.

The subject matter of this application is divided from my application, Serial No. 150,084, filed February 21, 1917.

A detachable retaining device of the nature shown and described is not only efficient in operation but is simple in structure, and economical to manufacture.

Having now set forth the object and nature of my invention, and a construction embodying the same, what I claim as new and useful, and of my own invention, and desire to secure by Letters Patent, is,—

1. The combination with a detachable wheel having a hub and an inner permanent hub to receive the same, of a cap nut having an exteriorly tapered peripheral surface, and a split ring retaining device having a correspondingly tapered bore mounted upon the tapered peripheral surface of said cap nut and engaging said wheel hub to retain the wheel on the inner hub.

2. The combination with a detachable wheel and a hub to receive the same, of a cap nut and a split retaining ring, of channel cross section, mounted on said nut and having an annular rim portion engaging and detachably retaining the wheel upon the hub.

In testimony whereof I have hereunto set my hand on this 1st day of October A. D., 1917.

JOSEPH LEDWINKA.

Certificate of Correction.

It is hereby certified that in Letters Patent No. 1,442,621, granted January 16, 1923, upon the application of Joseph Ledwinka, of Philadelphia, Pennsylvania, for an improvement in "Retaining Devices for Removable Wheels," an error appears in the printed specification requiring correction as follows: Page 1, line 52, for the words "device or sleeve" read *member;* and that the said Letters Patent should be read with this correction therein that the same may conform to the record of the case in the Patent Office.

Signed and sealed this 27th day of February, A. D., 1923.

[SEAL]
                KARL FENNING,
               *Acting Commissioner of Patents.*